United States Patent
Roberge et al.

(10) Patent No.: US 10,028,429 B2
(45) Date of Patent: Jul. 24, 2018

(54) PNEUMATIC DELIVERY SYSTEM FOR APPLICATION IMPLEMENT USING MULTIPLE METERING DEVICES

(71) Applicant: CNH Industrial Canada, Ltd., Saskatoon (CA)

(72) Inventors: Martin J. Roberge, Saskatoon (CA); Rex L. Ruppert, Benson, MN (US)

(73) Assignee: CNH Industrial Canada, Ltd., Saskatoon, Saskatchewan (CA)

( * ) Notice: Subject to any disclaimer, the term of this patent is extended or adjusted under 35 U.S.C. 154(b) by 0 days.

(21) Appl. No.: 15/711,234

(22) Filed: Sep. 21, 2017

(65) Prior Publication Data

US 2018/0007826 A1 Jan. 11, 2018

Related U.S. Application Data (62) Division of application No. 14/505,266, filed on Oct. 2, 2014, now Pat. No. 9,795,079.

(51) Int. Cl.
| | |
|---|---|
| *A01C 7/08* | (2006.01) |
| *A01C 15/04* | (2006.01) |
| *A01C 17/00* | (2006.01) |
| *A01C 21/00* | (2006.01) |
| *A01C 7/12* | (2006.01) |

(52) U.S. Cl.
CPC .............. *A01C 15/04* (2013.01); *A01C 7/081* (2013.01); *A01C 7/122* (2013.01); *A01C 21/00* (2013.01); *A01C 7/082* (2013.01); *A01C 17/001* (2013.01)

(58) Field of Classification Search
CPC .......... A01C 3/06; A01C 7/081; A01C 7/082; A01C 7/084; A01C 7/085; A01C 7/122; A01C 15/04; A01C 17/001; A01C 17/006; A01C 17/008; A01C 21/00
See application file for complete search history.

(56) References Cited

U.S. PATENT DOCUMENTS

| | | | |
|---|---|---|---|
| 2,947,544 A | 8/1960 | Hurt | |
| 4,280,419 A | 7/1981 | Fischer | |
| 4,705,220 A | 11/1987 | Gandrud et al. | |
| 4,793,743 A | 12/1988 | Grodecki et al. | |
| 4,852,809 A | 8/1989 | Davis et al. | |
| 5,379,706 A | 1/1995 | Gage et al. | |
| 5,485,962 A * | 1/1996 | Moss | A01C 15/04 239/655 |

(Continued)

OTHER PUBLICATIONS

Brochure entitles "Air Drills Air Carts," CNH America LLC (36 pages).

*Primary Examiner* — Darren W Gorman
(74) *Attorney, Agent, or Firm* — Rebecca L. Henkel; Rickard K. DeMille (57) ABSTRACT

A pneumatic delivery system for particulate agricultural products includes one or more compartment for containing and supplying one or more particulate product. An inductor assembly separately receives and fluidizes the particulate products and conveys the fluidized products to a metering assembly. The metering assembly separately meters each of the product flows and transfers the metered flows to one or more delivery units for applying the products. The pneumatic delivery system can be used on various implements, including planters and applicators for applying seeds, fertilizer, pesticides and other products.

15 Claims, 9 Drawing Sheets

(56) References Cited

U.S. PATENT DOCUMENTS

| | | | |
|---|---|---|---|
| 5,592,889 A * | 1/1997 | Bourgault | A01C 15/006 |
| | | | 111/174 |
| 6,009,354 A | 12/1999 | Flamme et al. | |
| 6,047,652 A | 4/2000 | Prairie et al. | |
| 6,070,539 A | 6/2000 | Flamme et al. | |
| 6,164,222 A | 12/2000 | Mayerle et al. | |
| 6,230,091 B1 | 5/2001 | McQuinn | |
| 6,564,730 B2 | 5/2003 | Crabb et al. | |
| 6,845,724 B2 | 1/2005 | Mayerle et al. | |
| 7,140,310 B2 | 11/2006 | Mayerle et al. | |
| 8,001,914 B2 | 8/2011 | Peterson et al. | |
| 8,543,238 B2 | 9/2013 | Straeter | |
| 2007/0039880 A1 | 2/2007 | Mayerle | |
| 2011/0054743 A1 | 3/2011 | Kocer et al. | |
| 2013/0192503 A1 | 8/2013 | Henry | |
| 2013/0197767 A1 | 8/2013 | Lenz | |
| 2013/0333601 A1 * | 12/2013 | Shivak | A01C 7/04 |
| | | | 111/118 |

* cited by examiner

PNEUMATIC DELIVERY SYSTEM FOR APPLICATION IMPLEMENT USING MULTIPLE METERING DEVICES

CROSS REFERENCE TO RELATED APPLICATIONS

This non-provisional divisional patent application claims priority to and benefit from U.S. Non-Provisional patent application Ser. No. 14/505,266, entitled "PNEUMATIC DELIVERY SYSTEM FOR APPLICATION IMPLEMENT USING MULTIPLE METERING DEVICES," filed Oct. 2, 2014, which is hereby incorporated by reference herein in its entirety.

BACKGROUND OF THE INVENTION

1. Field of the Invention

The present invention relates generally to agricultural equipment, and, more particularly, to a pneumatic agricultural product delivery system on an application implement, such as a planter or fertilizer application equipment, for applying particulate material such as seed, fertilizer, herbicide or insecticide in a field, either as a surface application or deposited in the soil.

2. Description of the Related Art

Pneumatic agricultural product delivery systems are known to utilize a flow of air to assist in the delivery and movement of particulate material or product such as fertilizer, seed, insecticide or herbicide from a product supply chamber through an interior passage provided by a series of elongate tubes which extend from the product supply chamber to a product applicator that places the product on or in growing medium, such as soil. Such pneumatic agricultural product delivery systems are commonly employed in planters, air drills, fertilizer and pesticide applicators and a variety of other agricultural implements.

Agricultural implements that employ a pneumatic agricultural product delivery system are known to have a particulate material supply source such as one or more tanks that are loaded with the particulate material or materials to be applied. The tanks have or are associated with a metering device, which typically consists of a rotating element, which meters the particulate materials from the tanks into a set of distribution channels, such as conduits, hoses, etc., for application to the farm field. In most systems, a pneumatic source such as a fan or blower provides air to convey and distribute material through the distribution channels. Once the metering of particulates is done and the mix of air and particulates is in the distribution channels, the solid concentration should remain nearly constant and in dilute phase.

Systems as described have provided certain advantages and have worked acceptably in some aspects, but are not without disadvantages, inefficiencies or inconveniences. For example, the long distribution lines following the metering device can plug and interrupt the flow of material to the units that apply the material to the field. Further, it is desirable to use a material supply source, such as a tank, with different applicator equipment by, for example, coupling the tanks with a planter for planting seed, and later coupling the same tank equipment with an applicator for applying needed pesticides and/or fertilizer. This has been difficult due to the necessary metering systems for applying the different materials. With the metering device provided on the tank, it is necessary to adjust the metering device whenever the tank is used for supplying a different material. This can be time consuming and inconvenient if the metering device is underneath the tank. Moreover, tank pressurization can be complex using metering devices due to the differences in pressure between the tank and meters.

What is needed in the art is an agricultural product conveying system which improves efficiency and convenience.

SUMMARY OF THE INVENTION

The present invention provides an agricultural product air conveyor system which transfers particulate material from a source container to application equipment on demand, and meters the material at the application equipment.

The invention in one form thereof is directed to a pneumatic agricultural product delivery system including at least one particulate material supply compartment; at least one particle delivery unit for applying particulate material from the supply compartment; a metering assembly providing a metered flow of particulate material from the at least one particulate material supply compartment to the at least one particle delivery unit; and an inductor assembly having a pneumatic source, a flow connection to the at least one particulate material supply compartment for receiving particulate material from the at least one compartment, and an outlet conduit providing an entrained flow of air and particulate material to the metering assembly.

The invention in another form is directed to a method of delivering at least one particulate agricultural product from at least one compartment containing the at least one product to a particle delivering unit applying the particle in a field. The method includes steps of supplying the at least one particulate agricultural product from the at least one compartment to an inductor assembly; fluidizing the at least one product in the inductor assembly; conveying the at least one fluidized product to a metering device; metering the at least one conveyed product in the metering device to provide a metered flow of the at least one product; transferring the metered flow of the at least one product to the particle delivering unit; and applying the transferred at least one product in an agricultural field.

The invention in still another form is directed to an agricultural applicator implement for applying particulate material in an agricultural field. The agricultural applicator implement includes a tank for containing the particulate material, an inductor assembly receiving particulate material from the tank, an outlet conduit from the inductor assembly; a metering assembly connected to the outlet conduit downstream from the inductor assembly; and a particulate delivery unit receiving metered flow of particulate material from the metering assembly and applying the particulate material in an agricultural field.

An advantage of the present pneumatic delivery system is minimizing complications when changing equipment, and if the inductors cover a large spectrum of seed and/or fertilizer types, to use a common tank for many applications.

Another advantage is providing a more stable system less prone to adverse impact from variations and interruptions in the fluidized transport of air-entrained products.

Still another advantage is providing a system that is adaptable to uses with different types of particulate products and on different types of agricultural implements.

BRIEF DESCRIPTION OF THE DRAWINGS

The above-mentioned and other features and advantages of this pneumatic delivery system, and the manner of attaining them, will become more apparent and the pneumatic delivery system will be better understood by reference to the following description of embodiments of the pneumatic delivery system taken in conjunction with the accompanying drawings, wherein.

Corresponding reference characters indicate corresponding parts throughout the several views. The exemplifications set out herein illustrate embodiments of the pneumatic delivery system and such exemplifications are not to be construed as limiting the scope of the invention in any manner.

DETAILED DESCRIPTION OF THE INVENTION

Figure 1:
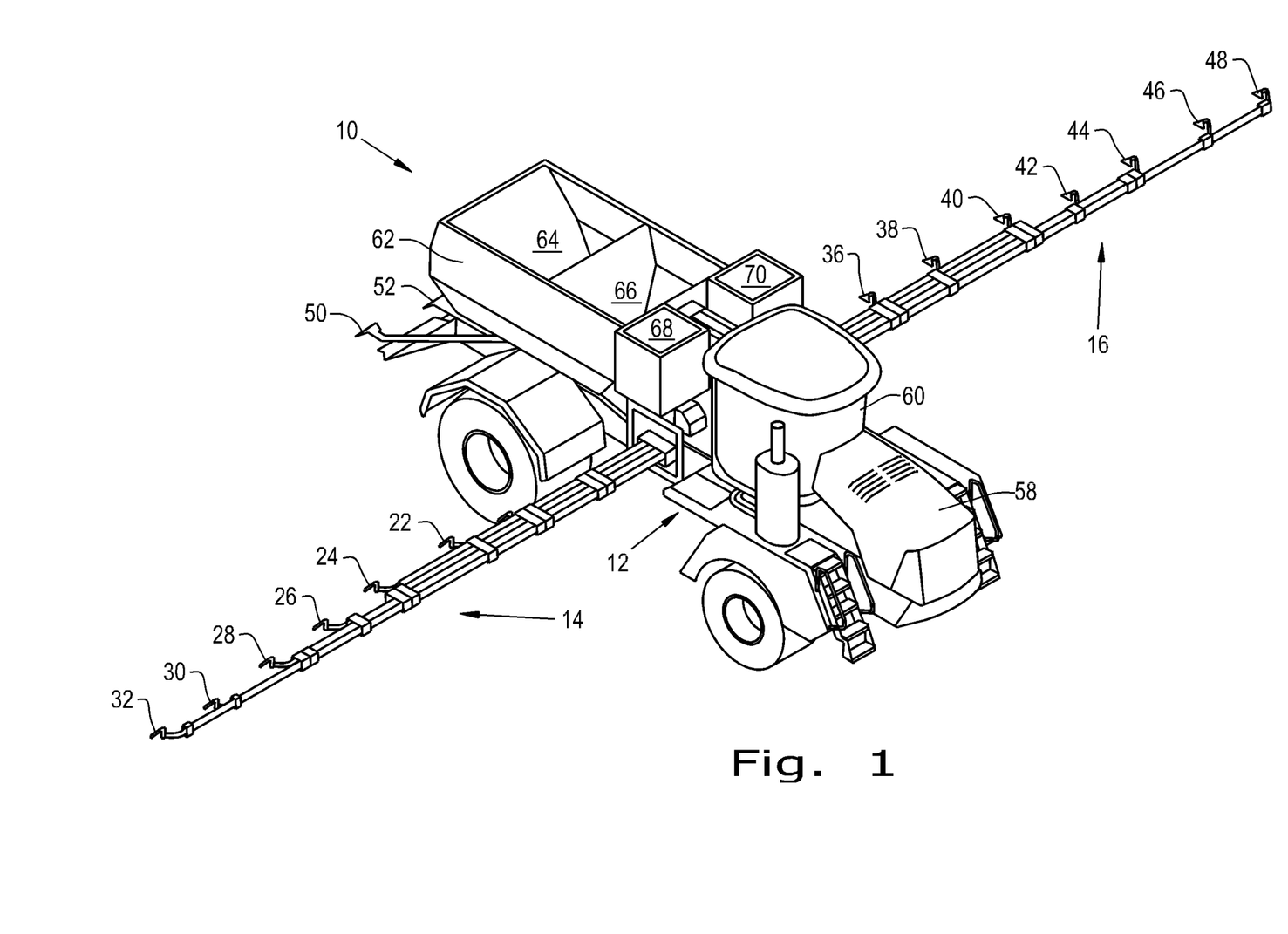
FIG. 1 is a perspective view of an agricultural application implement, in the nature of a fertilizer spreader, having a pneumatic delivery system as disclosed herein.
Figure 2:
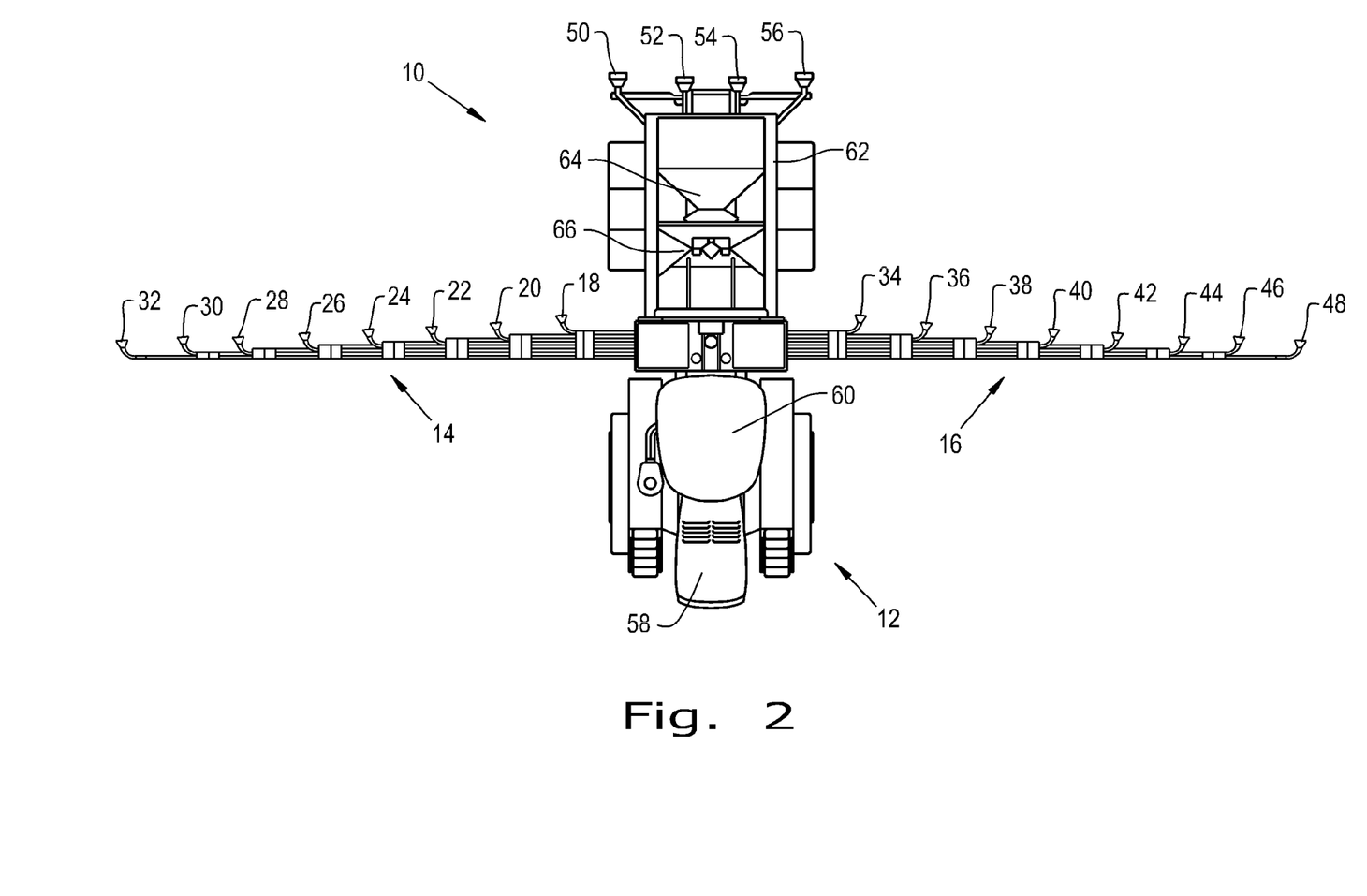
FIG. 2 top view of the fertilizer spreader shown in FIG. 1.
Figure 3:
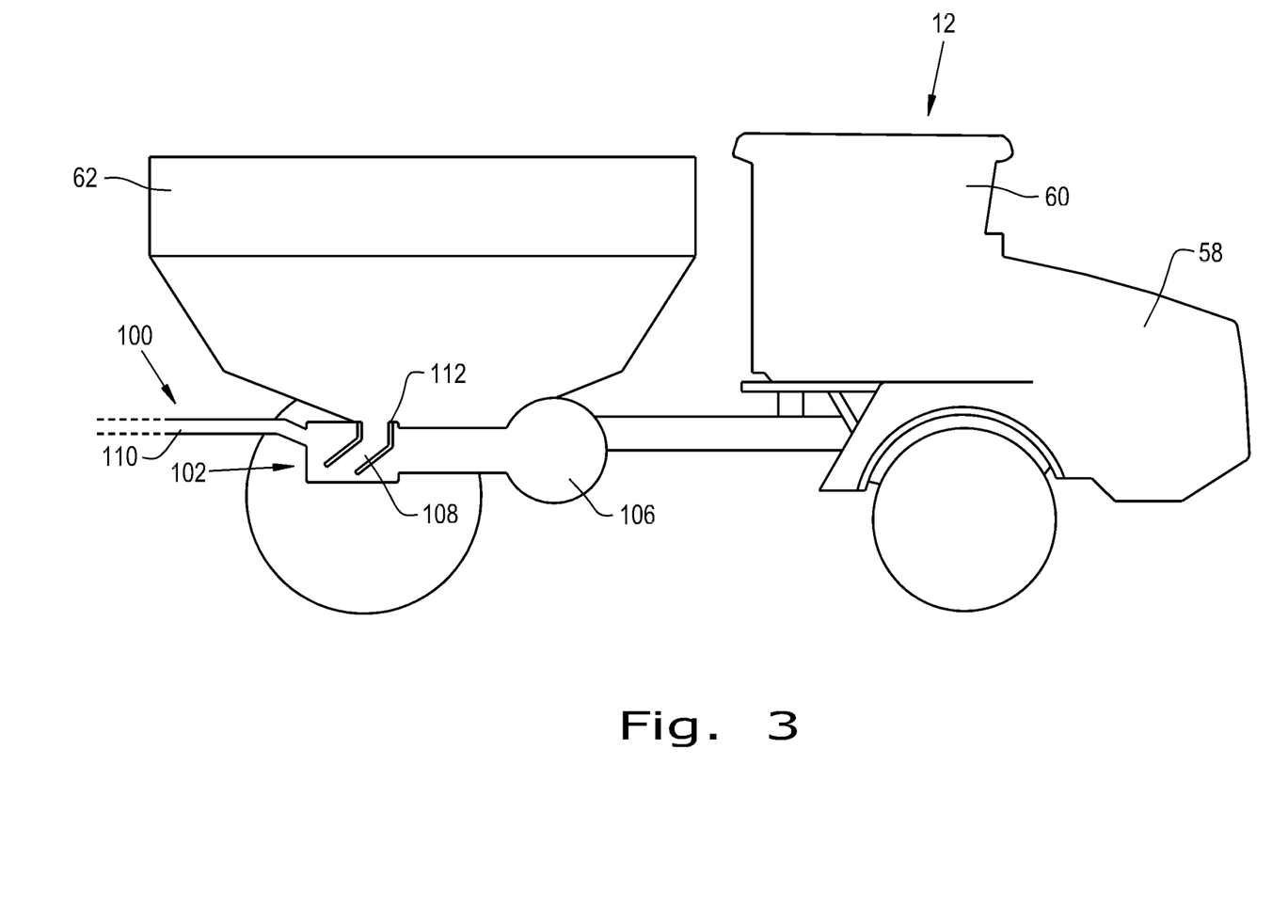
FIG. 3 is a side view, in simplified form, of the fertilizer spreader.

Referring now to the drawings, and more particularly to FIGS. 1-3, there is shown an agricultural application implement 10, on which a pneumatic delivery system 100 can be used. In the exemplary embodiment shown, application implement 10 is a pneumatic granular fertilizer applicator 10. As is known in the art, applicator 10 generally includes a large tired transport unit 12 such as truck or tractor, and laterally extending particle delivery booms 14 and 16, which may be pivoted to a stowed position close to the implement for storage or transport. Each boom 14, 16 includes a plurality of boom tubes or conduits terminating at the outboard end in a particle delivering unit, which for fertilizer applicator 10 are a spreading outlet or nozzle. In the exemplary embodiment shown, boom 14 includes eight nozzles 18, 20, 22, 24, 26, 28, 30 and 32; and boom 16 includes nozzles 34, 36, 38, 40, 42, 44, 46 and 48. Additionally, at the back of applicator 10 there are rear nozzles 50, 52, 54 and 56 to provide full and complete coverage across the width of implement 10, include the area between the inboard-most nozzles 18 and 34 of booms 14, 16. Implement transport unit 12 is self-propelled by an engine in an engine compartment 58 and includes an operator cab 60. In the exemplary embodiment shown, a tank 62 includes compartments 64 and 66 for carrying particulate material to be distributed to and disbursed by nozzles 18-56. Further smaller compartments 68, 70 can be provided to supply micro-nutrients or other materials to nozzles 18-56. The supply of particulate material in compartments 64, 66, 68, 70 is replenished periodically from a still larger volume supply vehicle.

Fertilizer applicator 10 is illustrative of the types of equipment for which the pneumatic delivery system can be used; however, it should be understood that the pneumatic delivery system may, of course, be employed in conjunction with other agricultural equipment such as tillage, seeding or planting devices, and is useful in distributing particulate material other than fertilizer.

Figure 4:
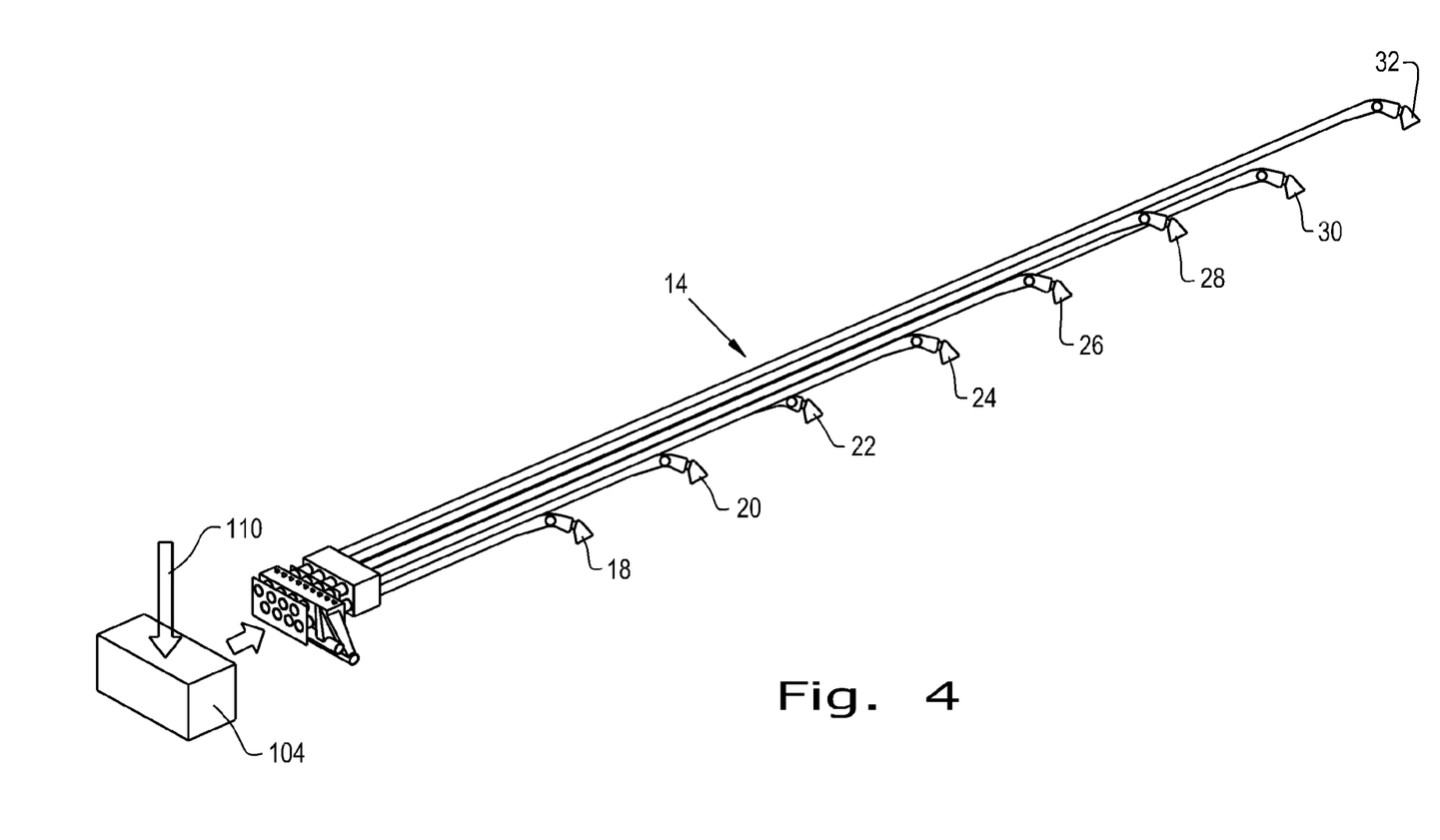
FIG. 4 is an enlarged partially exploded view of a portion of the fertilizer spreader.

With reference now particularly to FIGS. 3 and 4, in a simple form thereof, pneumatic delivery system 100 includes an inductor assembly 102 and a metering assembly 104. Inductor assembly 102 receives particulate material from tank 62 and supplies the particulate material to metering assembly 104. Metering assembly 104 distributes metered flows of the particulate material for distribution by nozzles 18-56.

Inductor assembly 102 can be provided beneath tank 62 to receive particulate material from tank 62 under gravitational flow. Inductor assembly 102 includes a pneumatic source, such as a fan 106, an inductor 108, an outlet conduit 110 from inductor 108 and a flow connection 112 to tank 62. Inductor 108 can be of known design and configuration, such as, for example and not limitation, that shown in U.S. Pat. No. 7,182,029 "Inductor Assembly for a Product Conveying System" or that shown in U.S. Pat. No. 8,534,208 "Product Conveyance System for an Agricultural Implement". Other types of inductors also can be used. Those skilled in the art will readily understand the manner in which inductor assembly 102 produces a flow of air that combines with particulate material to generate a combined stream of forced air and the particulate material which is discharged through outlet conduit 110.

Metering assembly 104 receives the flow of particulate materials from inductor assembly 102 and provides controlled, metered flow to the nozzles 18-56 by managing the air flow that controls particulate fluidization in the inductor, such as known for planters using a vacuum fan to control the quantity seeds going through the inductor. A seed gate also can be used to control fluidization. Various types of metering devices can be used and can be carried by that portion of implement 10 which performs actual material distribution. Accordingly, one type of metering device can be used when distributing particulate material of a first type and a different type of metering device can be used when distributing particulate material of a second type.

It should be understood that separate and discrete inductors are provided for the number of compartments in tank 62, with each such inductor having a separate outlet 110 there from to provide the particulate materials to metering assembly 104. Further, while FIG. 4 shows a metering assembly 104 having a single unit distributing metered flow to each of the nozzles 18-32 on boom 14, it should be understood that multiple metering devices within the metering assembly can be provided.

Figure 5:
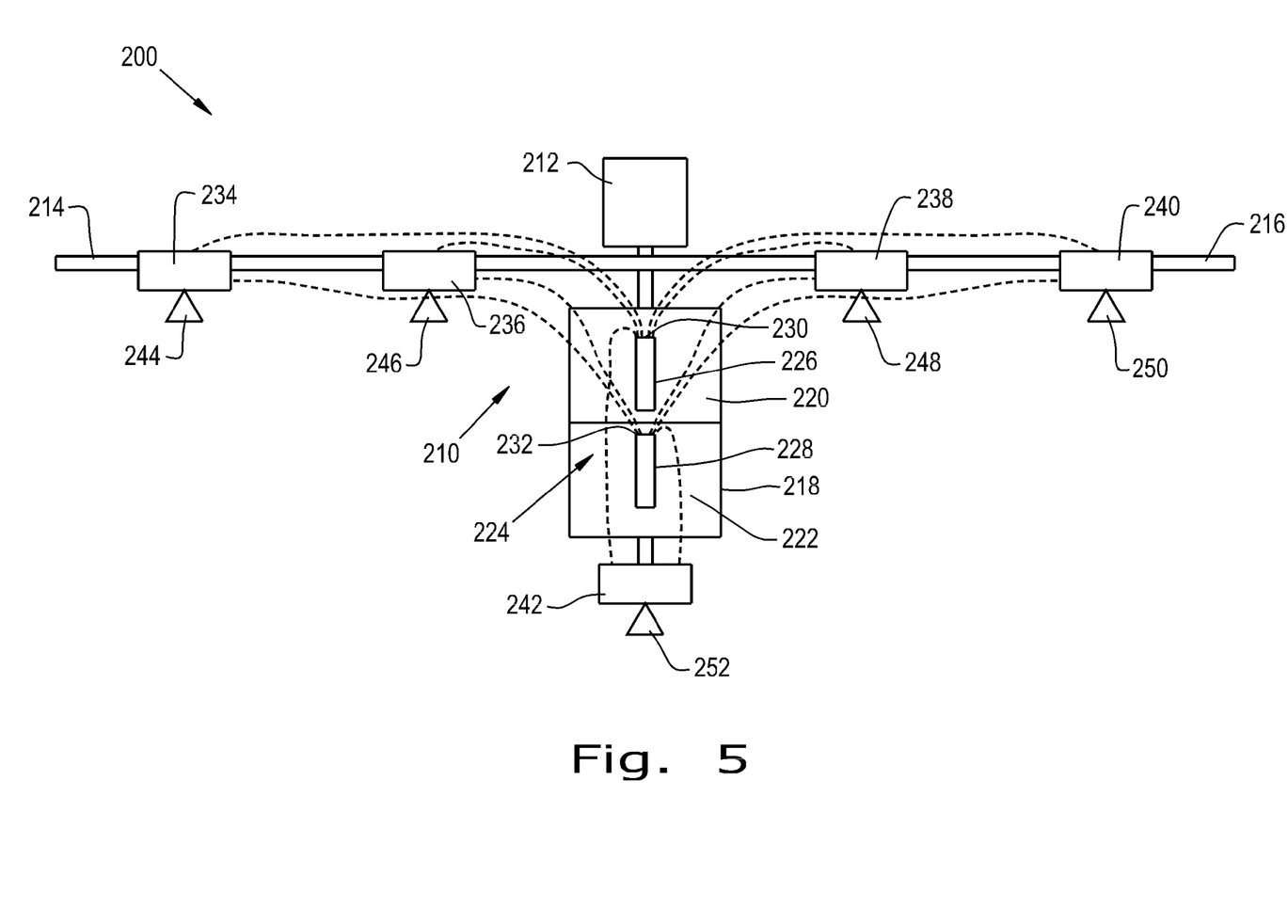
FIG. 5 is a top view in schematic form of another embodiment of a pneumatic delivery system on a fertilizer spreader.

FIG. 5 schematically illustrates an implement 200 having a pneumatic delivery system 210. Implement 200 is similar to implement 10, having a transport unit 212 and booms 214, 216. A tank 218 includes compartments 220, 222. Pneumatic delivery system 210 includes an inductor assembly 224 having separate inductors 226, 228 for compartments 220, 222, respectively. Each inductor 226, 228 has an outlet 230, 232, that is connected to each of a plurality of metering devices. Boom 214 is provided with metering devices 234, 236; boom 216 is provided with metering devices 238, 240 and a rear metering device 242 is provided at the rear of a transport unit 212. Each metering device 234-242 receives particulate material flow from each inductor 226, 228. Metering devices 234-242 each provide metered material flow to one or more particle delivery unit 244, 246, 248, 250, and 252 respectively. Particle delivery units 244-252 can be nozzles as described previously or can be other types of delivery units such as rotating plates for the distribution of particulate material deposited thereon.

Figure 6:
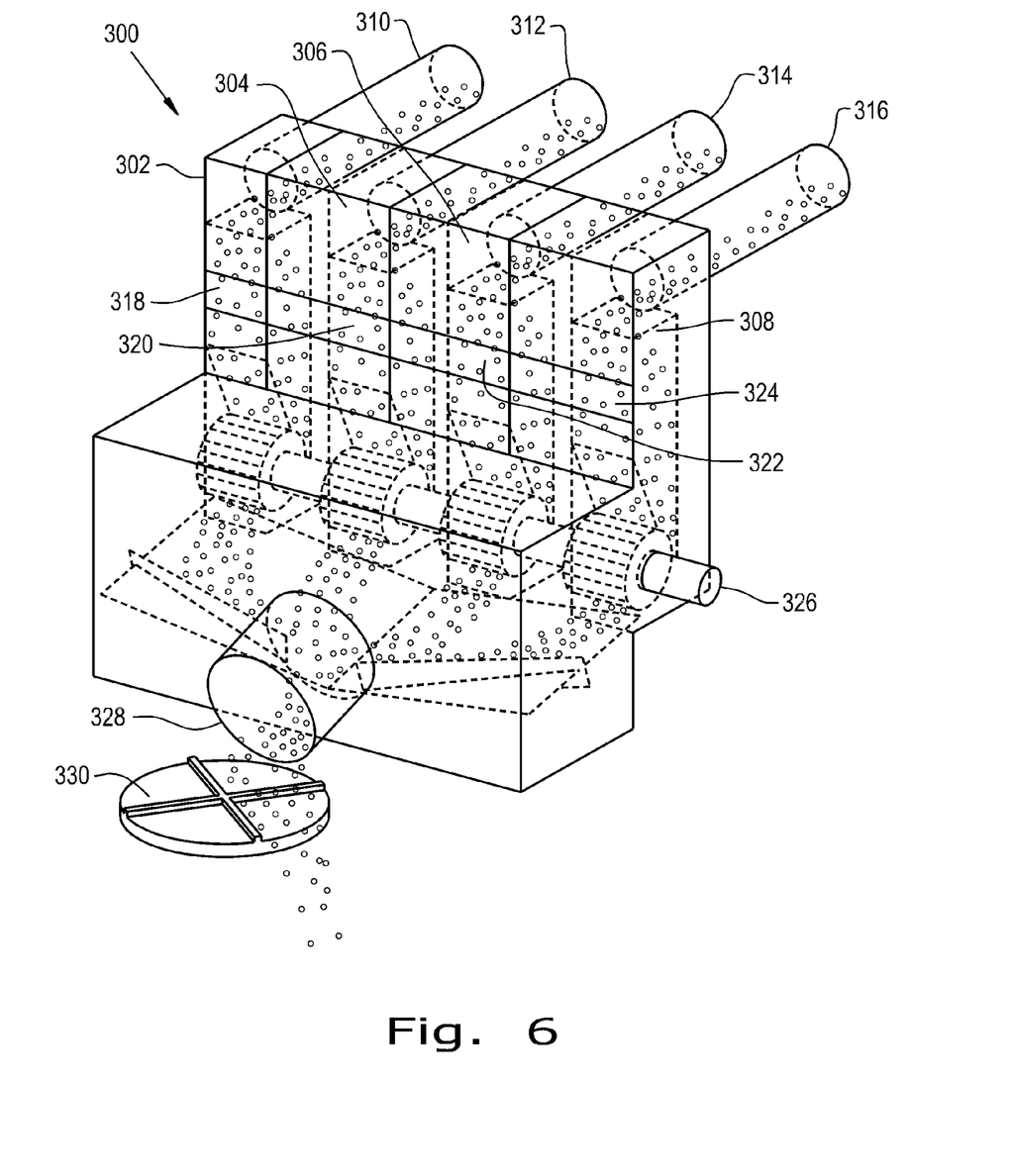
FIG. 6 is a perspective view of a metering device useful for the pneumatic delivery systems disclosed herein.

The metering devices disclosed herein can be of various types. By way of example and not limitation, a metering device 300 is illustrated in FIG. 6. Metering device 300 is provided for metering the flow of four particulate materials, such as may be included in a fertilizer and/or pesticide application. Metering device 300 includes an individual accumulation hopper 302, 304, 306, 308 for each particulate material that is being applied. Hoppers 302-308 receive particulate material from inductors (not shown) by way of inductor outlet conduits 310, 312, 314, 316. Each of the accumulation hoppers 302-308 is provided with an air breather 318, 320, 322, 324, respectively. As known to those skilled in the art, hoppers 302-308 provided with breathers 318-324 can operate with a pneumatic supply of material thereto in an on-demand fashion. As a particulate material accumulates in one of the hoppers 302-308, the particulate material obstructs the breather 318-324 associated with the hopper, thereby stopping the flow of particulate material to the hopper. As the level of particulate material decreases in a hopper 302-308, flow of particulate material thereto will resume. A vacuum inlet as known for planters also can be used.

Metered dispensing of particulate material from accumulation hoppers 302-308 can be by known means, such as a rotating metering roll 326. In the exemplary embodiment shown, metering device 300 provides a combined flow of metered particles via a particle mixing drum 328 that receives the individual metered flows from hoppers 302-308, mixes the particulate materials and dispenses the mixed materials to a rotary spreader 330. The rollers can be separated by some minimal distance, or by a physical barrier or divider.

Since metered distribution of material continues even when the flow of particulate material to a hopper is interrupted, normal distribution of the material will continue until the hopper is empty, even if the upstream flow to the hopper is interrupted by plugging or the like. Placing the meter at the end of the material conveying circuit, near the point at which the particulate material is applied, and separating the meter by way of the on-demand hopper system isolates the meter from changes in pressure upstream of the hoppers, such as may occur during temporary plugging and/or plug clearing.

Figure 7:
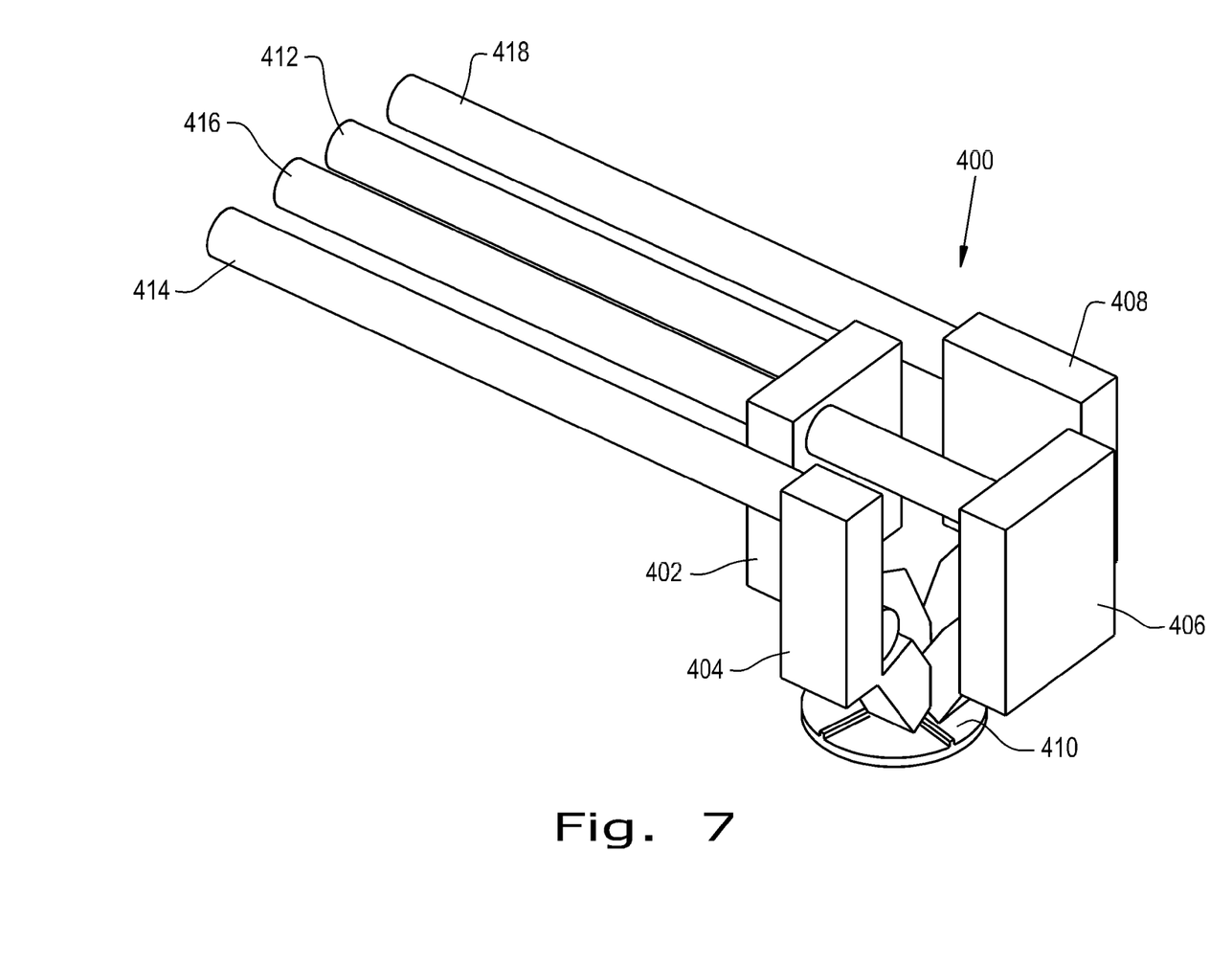
FIG. 7 is a perspective view of another metering device.
Figure 8:
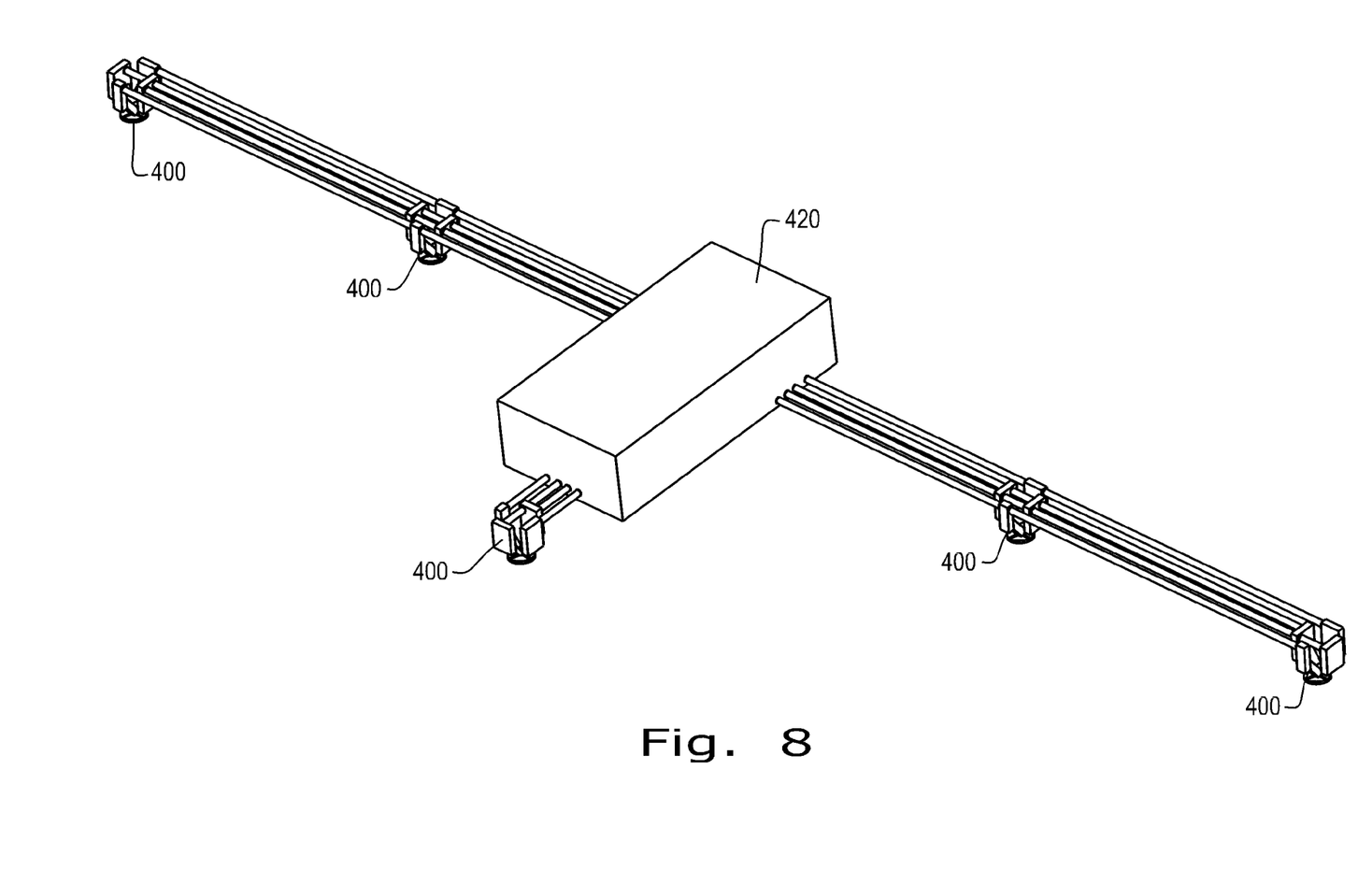
FIG. 8 is a perspective view of an implement employing a plurality of the metering devices shown in FIG. 7.

FIG. 7 illustrates another metering assembly associated with a rotating applicator. Carousel metering assembly 400 includes an array of individual metering devices 402, 404, 406, 408 which may be compact individual metering units of various types, including rotating rolls, vibrating meters and the like. Metering devices 402-408 individually dispense metered particulate material onto a rotary spreader 410. Metering devices 402-408 are supplied with a flow of particulate material via outlet conduits 412, 414, 416, 418, respectively. FIG. 8 illustrates the use of five carousel metering assembly's 400 each receiving particulate material from an inductor assembly 420. Meters can be driven individually by electric motors, hydraulic motors or the like; or the meters can be linked together mechanically using a variable speed system of clutches, brakes and the like.

While the pneumatic delivery systems disclosed so far herein have been primarily with respect to pneumatic fertilizer application equipment commonly referred to as a "floater", it should be understood that the advantages from the pneumatic delivery systems disclosed herein can be obtained on other types of equipment for applying particulate materials in a field. Planters of various types are known to include an applicator unit, such as a drill or seeder, and may include an air cart having one or more bulk tanks carrying fertilizer and/or seeds to be planted. The pneumatic delivery systems disclosed herein can be provided by way of one or more metering assembly on the planter, and one or more inductor on the air cart. If the air cart is then used with a planter of a different type, or with another type of particle application equipment, adjustments to the metering assembly can be made without the need to adjust the inductor assembly on the air cart. Accordingly, switching from one crop to another crop or from one planter to another planter does not require major adjustment of the inductor assembly on the air cart.

Figure 9:
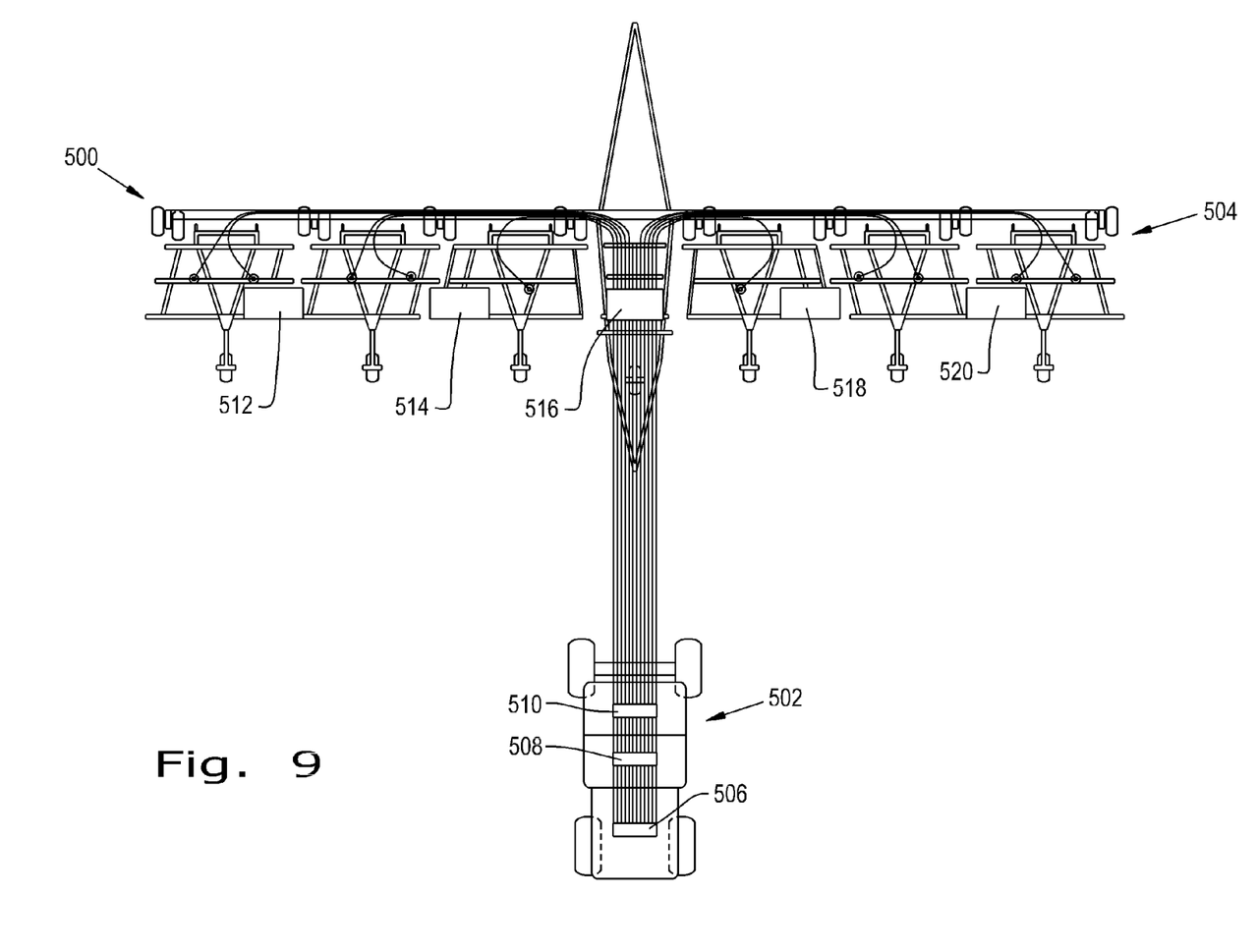
FIG. 9 is a perspective view of another agricultural implement, an air seeder, having a pneumatic delivery system as disclosed herein.

FIG. 9 illustrates an agricultural application implement in the form of an air seeder 500 that includes an air cart 502 and an air drill 504. Air cart 502 includes inductors 506, 508, 510 to fluidize particulate material contained in each of three separate compartments. Each inductor 506, 508, 510 is connected to each of a plurality of metering devices 512, 514, 516, 518, 520. Metering devices 512-520 meter seeds and/or other particulate material in controlled flows to pluralities of particle delivery units that deposit the seeds and/or other particulate material in the farm field.

In using a pneumatic delivery system as disclosed herein, a variety of materials can be applied by a variety of different implements. The particulate material to be applied is contained in one or more compartments. The particulate material or materials are supplied to an inductor assembly wherein the material or materials are fluidized and conveyed to one or more metering device. At the metering device the conveyed product or products are provided in a metered flow and transferred to one or more particle delivery unit, which can be a broadcast spreader, seeder for depositing seeds or other materials across the surface of soil, a row opener unit for depositing seeds or other material in rows, or the like. When advantageous, the metered flows can be combined and the combined flow in appropriate proportions then provided to the particle delivery unit or units.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A pneumatic agricultural product delivery system, comprising:
   a plurality of particulate material supply compartments;
   a plurality of particle delivery units for applying particulate material from the plurality of particulate material supply compartments;
   a plurality of metering devices positioned near the plurality of particle delivery units, each metering device providing a metered flow of particulate material from selected particulate material supply compartments to one of the plurality of particle delivery units; and
   a plurality of inductor assemblies, each inductor assembly having a pneumatic source, a flow connection provided to each of the plurality of particulate material supply compartments for receiving particulate material from each of the plurality of particulate material supply compartments, and each inductor assembly having an outlet conduit providing an entrained flow of air and particulate material to each of the plurality of metering devices, wherein each metering device of the plurality of metering devices is axially aligned with and connected to its respective conduit and each of the plurality of metering devices is positioned near at least one of the plurality of particle delivery units such that an outlet of each of the plurality of metering devices is positioned over the at least one particle delivery unit for delivering particulate material thereto, and wherein at least a first metering device of the plurality of metering devices is positioned next to the at least one particle delivery unit, and the first metering device includes an outlet conduit which extends through the first metering device and into an axially aligned and spaced-apart second metering device to deliver particulate material through the outlet conduit to the second metering device, the second metering device positioned next to the at least one particle delivery unit to deliver particulate material thereto.

2. The pneumatic agricultural product delivery system of claim 1, wherein the outlet conduit which extends through the first metering device to the second metering device is positioned above and extends across the at least one particle delivery unit.

3. The pneumatic agricultural product delivery system of claim 1, wherein the first metering device and the second metering device are parallel to each other.

4. The pneumatic agricultural product delivery system of claim 3, wherein at least a third metering device is positioned near the first metering device and the second metering device.

5. The pneumatic agricultural product delivery system of claim 4, wherein at least a fourth metering device is positioned opposite to and spaced-apart from the third metering device.

6. The pneumatic agricultural product delivery system of claim 5, wherein the third metering device and the fourth metering device are parallel to each other and the third metering device and the fourth metering device each deliver particulate material to the at least one particle delivery unit.

7. The pneumatic agricultural product delivery system of claim 1, including an on-demand connection between each metering device of the plurality of metering devices and its associated inductor assembly connected thereto.

8. The pneumatic agricultural product delivery system of claim 1, including an on-demand connection between at least some of the plurality of metering devices and each inductor assembly connected thereto.

9. The pneumatic agricultural product delivery system of claim 1, wherein at least one of the plurality of particle delivery units includes a rotary spreader.

10. An agricultural applicator implement for applying particulate material in an agricultural field, comprising:

a tank for containing the particulate material, the tank including a plurality of particulate material supply compartments;

a plurality of inductor assemblies, each inductor assembly of the plurality of inductor assemblies having a pneumatic source, a flow connection provided to each of the plurality of particulate material supply compartments for receiving particulate material from each of the plurality of particulate material supply compartments in the tank;

a plurality of outlet conduits, one of each of the plurality of outlet conduits extending from one of each of the plurality of inductor assemblies, each outlet conduit providing an entrained flow of air and particulate material;

a plurality of metering devices, one of each of the plurality of metering devices connected to one of each of the plurality of outlet conduits downstream from the plurality of inductor assemblies and receiving the entrained flow of air and particulate material therefrom, each metering device and its associated inductor assembly connected thereto providing an on-demand connection therebetween; and a plurality of particulate delivery units, each particulate delivery unit positioned near at least one of the plurality of metering devices, each particulate delivery unit receiving a metered flow of particulate material from the at least one of the plurality of metering devices via an outlet formed in each of the plurality of metering devices, and each particulate delivery unit applying the particulate material in an agricultural field, wherein each metering device of the plurality of metering devices is axially aligned with and connected to its respective outlet conduit, and wherein at least a first metering device of the plurality of metering devices is positioned near at least one particle delivery unit of the plurality of particle delivery units, the first metering device including an outlet conduit which extends through the first metering device and into an axially aligned and spaced-apart second metering device to deliver particulate material through the outlet conduit to the second metering device, the second metering device positioned near the at least one particle delivery unit to deliver particulate material thereto.

11. The pneumatic agricultural product delivery system of claim 10, wherein the outlet conduit which extends through the first metering device to the second metering device is positioned above and extends across the particle delivery unit.

12. The pneumatic agricultural product delivery system of claim 10, wherein the first metering device and the second metering device are parallel to each other.

13. The pneumatic agricultural product delivery system of claim 12, wherein at least a third metering device is positioned near the first metering device and the second metering device.

14. The pneumatic agricultural product delivery system of claim 13, wherein at least a fourth metering device is positioned opposite to and spaced-apart from the third metering device.

15. The pneumatic agricultural product delivery system of claim 14, wherein the third metering device and the fourth metering device are parallel to each other and the third metering device and the fourth metering device each deliver particulate material to the at least one particle delivery unit.

* * * * *